United States Patent [19]
Rice et al.

[11] Patent Number: 5,973,672
[45] Date of Patent: Oct. 26, 1999

[54] MULTIPLE PARTICIPANT INTERACTIVE INTERFACE

[75] Inventors: Jason Rice, Dallas; Larri A. Rosser, Ft. Worth, both of Tex.

[73] Assignee: Raytheon Company, Lexington, Mass.

[21] Appl. No.: 08/731,354

[22] Filed: Oct. 15, 1996

[51] Int. Cl.$^6$ ..................................................... G09G 5/08
[52] U.S. Cl. .......................................... 345/158; 345/157
[58] Field of Search ..................................... 345/158, 156, 345/157, 9; 348/2, 13, 20; 353/13, 14; 359/462, 463; 434/324, 325; 356/365, 364, 369

[56] References Cited

U.S. PATENT DOCUMENTS

| | | | |
|---|---|---|---|
| 4,013,368 | 3/1977 | Acker et al. | 356/246 |
| 4,280,135 | 7/1981 | Schlossberg | 358/93 |
| 4,544,836 | 10/1985 | Galvin et al. | 235/487 |
| 5,181,015 | 1/1993 | Marshall et al. | 345/158 |
| 5,489,923 | 2/1996 | Marshall et al. | 345/156 |
| 5,502,459 | 3/1996 | Marshall et al. | 345/158 |
| 5,504,501 | 4/1996 | Hauck et al. | 345/158 |
| 5,515,079 | 5/1996 | Hauck | 345/158 |
| 5,528,263 | 6/1996 | Platzker et al. | 345/156 |
| 5,589,822 | 12/1996 | Stern | 340/583 |
| 5,682,181 | 10/1997 | Nguyen et al. | 345/158 |

*Primary Examiner*—Brent A. Swarthout
*Attorney, Agent, or Firm*—William C. Schubert; Glenn H. Lenzen, Jr.

[57] ABSTRACT

A multiple participant interactive system that includes a projection screen (11), a projector (13) for projecting polarized light onto the imaging surface to produce a visible image on the imaging surface, a plurality of light pointers (15) for projecting respective non-polarized beams of light onto the projection screen to produce visible spots on the projection screen, a video detector (17) for detecting the visible spots on the projection screen and providing a video output that represents the visible spots on the projection screen, a computer (21) for processing the video output of the video detector, and a video source (23) which is controlled by the computer and provides a video input to the projector.

13 Claims, 1 Drawing Sheet

MULTIPLE PARTICIPANT INTERACTIVE INTERFACE

BACKGROUND OF THE INVENTION

The disclosed invention is directed generally to a multiple participant interactive interface system, and more particularly to a wireless multiple participant interactive interface system.

Multiple participant interactive systems are utilized in applications such as group training, group surveys, group interactive games, and interactive theater wherein inputs are required from each individual of a large group of persons. Known multiple participant interactive systems typically include wired participant input devices such as keyboards and joysticks. Considerations with such wired participant input devices include costly interface electronics, bandwidth limitations that lead to sluggish feedback, hard limits on the number of participants, and limitations on the physical location of participants. Moreover, input devices such as keyboards and joysticks are subject to failure, do not inherently provide participant actuator positional feedback, and require participant learning for efficient operation.

SUMMARY OF THE INVENTION

It would therefore be an advantage to provide a wireless multiple participant interactive interface system.

Another advantage would be to provide a wireless multiple participant interactive interface system that does not require complex input device interfaces.

Still another advantage would be to provide a wireless multiple participant interactive interface system that utilizes input devices that are easy to use.

The foregoing and other advantages are provided by the invention in a multiple participant interactive system that includes a projection screen, a projector for projecting polarized light onto the imaging surface to produce a visible image on the imaging surface, a plurality of light pointers for projecting respective non-polarized beams of light onto the projection screen to produce visible spots on the projection screen, a video detector (17) for detecting the visible spots on the projection screen and providing a video output that represents the visible spots on the projection screen, a computer for processing the video output of the video detector, and a video sources which is controlled by the computer and provides a video input to the projector.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
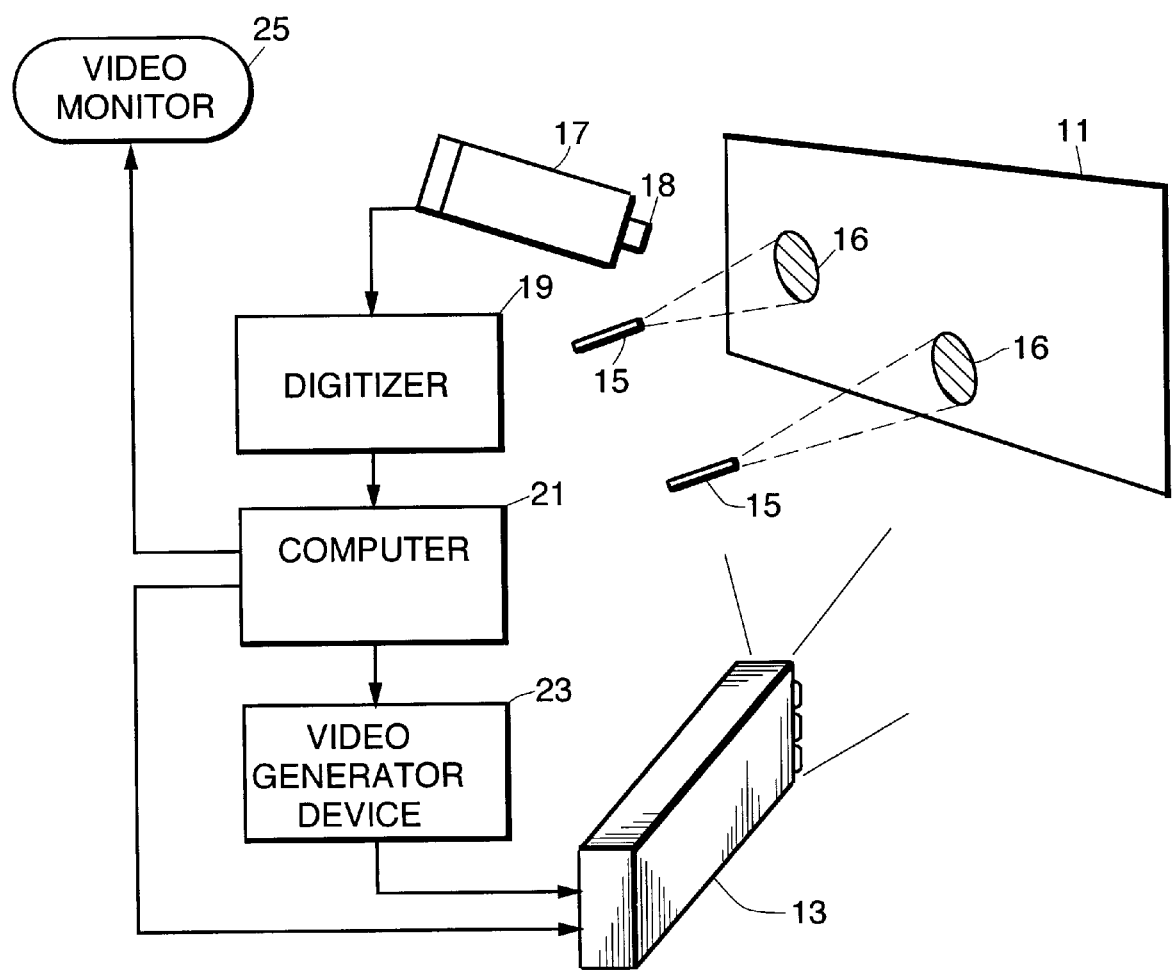
FIG. 1 sets forth a schematic block diagram of a multiple participant interactive interface system in accordance with the invention.

Referring now to FIG. 1, set forth therein is a schematic block diagram of a multiple participant interactive interface system in accordance with the invention. The multiple participant interactive interface system includes a projection screen 11, and a projector 13 for projecting polarized imaging light to the projection screen 11 so as to produce a visible image on the projection screen, wherein the visible image is a reflection of the polarized imaging light and is polarized. By way of illustrative example, the projector 13 comprises a high brightness LCD projector such as a commercially available high intensity Hughes/JVC Lightvalve LCD projector. A plurality of participant manipulated light pointers 15 are utilized by participants to project narrow, focused non-polarized beams of light to the projection screen 11 so as to produce respective visible illuminated spots 16 on the projection screen which are non-polarized reflections of the non-polarized beams. The light pointers 15 can be of different color lights outputs.

A video detector 17 is configured to receive reflected light from the projection screen which passes through a cross-polarizing filter 18 that is adjusted so that the reflected light that originated from the projector 13 is rejected. In particular, the video detector 17 detects only the reflected light that originated from the participant manipulated light pointers 15 and thus detects the visible illuminated spots 16 on the projection screen without detecting the visible image projected by the projector 13. The video detector 17 generally comprises an imaging array such as a CCD array and an imaging lens for imaging the projection screen onto the imaging array, and provides a video output that represents an image of the non-polarized spots 16 on the projection screen. By way of particular example, the video detector 17 comprises a video camera.

The video output of the video detector 17 is provided to a video digitizer 19 which provides digitized video data to a computer 21. The digitized video data is utilized by the computer 21 to detect participant commands, responses, or other participant inputs as represented by location and/or color, and to control a suitable video generator device 23 which provides a video output to the projector 13. For example, the digitized video data is utilized within the computer 21 as inputs to analysis and control processes. Regions of the display surface can be dedicated persistently or momentarily for input, and digitized detected light may be integrated or averaged over a region to achieve an approximate count of inputs intended for that region, or independent points and clusters can be tallied or tabulated. These data may in turn be used by processes that store data or statistics, or control the interactive projection images. For example, a button or other suitable icon can be activated by directing the output of a light pointer to the icon. As another example, a vote can be taken by subdividing the image on the display screen into different areas that represent different choices.

By way of illustrative example, the video generator device 23 comprises a laser disk player. Alternatively, the computer 21 can generate a video output for the projector 13. A video monitor 25 is provided for use in the operation of the computer 19, and can be utilized for example to display an image of the video output of the video detector 17.

The disclosed multiple participant interactive interface system can be used in interactive theater, video arcades, statistical polling, and other interactive applications.

The foregoing has thus been a disclosure of a wireless multiple participant interactive interface system that advantageously does not require complex input device interfaces and utilizes input devices that are easy to use, provide visual feedback, and are easily replaced.

Although the foregoing has been a description and illustration of specific embodiments of the invention, various modifications and changes thereto can be made by persons skilled in the art without departing from the scope and spirit of the invention as defined by the following claims.

What is claimed is:

1. A multiple participant interactive system comprising:

an imaging surface;

projection means for projecting polarized imaging light onto said imaging surface to produce a visible image on said imaging surface;

a plurality of light pointers for projecting respective non-polarized beams of light onto said imaging surface to produce visible spots on said imaging surface, said spots being non-polarized reflections of said non-polarized beams of light;

a cross-polarizing optical filter for rejecting said polarized imaging light;

video detection means responsive to light passed by the optical filter for detecting only said non-polarized reflections without detecting the visible image projected by said projecting means and providing a video output that represents an image of said spots on said imaging surface; and processing means responsive to said detection means for providing a video input to said projection means.

2. The multiple participant interactive system of claim 1 wherein said plurality of light pointers provide light outputs of different colors.

3. The multiple participant interactive system of claim 1 wherein said projection means comprises an LCD projector.

4. The multiple participant interactive system of claim 1 wherein said video detection means comprises a video camera.

5. The multiple participant interactive system of claim 4 wherein said processing means includes a video digitizer and a computer.

6. The multiple participant interactive system of claim 5 wherein said processing means further includes a laser disk player.

7. The multiple participant interactive system of claim 1 wherein said video detection means further comprises an imaging array and an imaging lens for imaging the projection screen onto the imaging array.

8. The multiple participant interactive system of claim 1 wherein said video detection means further comprises a video camera.

9. An interactive system comprising:

an imaging surface;

a projector for projecting polarized imaging light onto said imaging surface to produce a visible image on said imaging surface;

at least one light pointer for projecting a non-polarized beam of light onto said imaging surface to produce a visible spot on said imaging surface, said spot being a non-polarized reflection of said non-polarized beam of light;

a cross-polarizing optical filter for rejecting said polarized imaging light;

a video detector responsive to light passed by the optical filter for detecting only said non-polarized reflection without detecting the visible image projected by said projector and providing a video output that represents an image of said spot on said imaging surface; and processing means responsive to said detection means for providing a video input to said projection means.

10. The interactive system of claim 9 wherein said video detector comprises a video camera.

11. The interactive system of claim 9 wherein said projection means comprises an LCD projector.

12. The interactive system of claim 9 wherein said video detector comprises a video camera.

13. The interactive system of claim 9 wherein said processing means includes a video digitizer and a computer.

* * * * *